Palmer & Williams.
Harvester Rake.
No. 1,682. Reissued May 31, 1864.
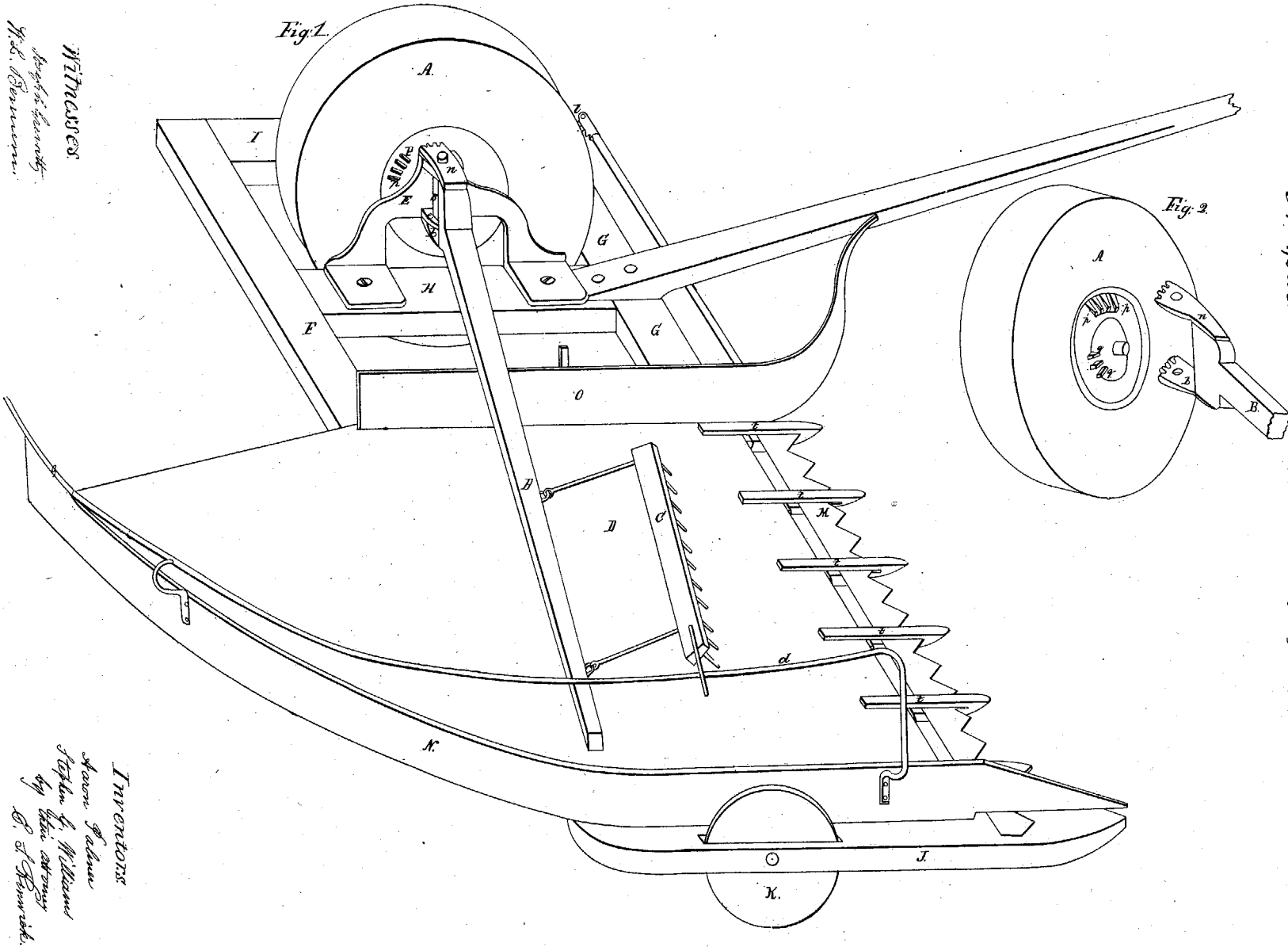
Witnesses.
Joseph Gurnett
W. L. Bennem.
Inventors.
Aaron Palmer
Stephen G. Williams
by their attorney
E. S. Renwick.
N. PETERS, PHOTO-LITHOGRAPHER, WASHINGTON, D. C.

UNITED STATES PATENT OFFICE.

A. PALMER, OF BROCKPORT, NEW YORK, AND STEPHEN G. WILLIAMS, OF JANESVILLE, WISCONSIN, ASSIGNORS TO DAYTON S. MORGAN AND WM. H. SEYMOUR, OF BROCKPORT, N. Y.

IMPROVEMENT IN HARVESTERS.

Specification forming part of Letters Patent No. 8,192, dated July 1, 1851; Reissue No. 5, dated January 1, 1861; Reissue No. 1,682, dated May 31, 1864.

*To all whom it may concern:*

Be it known that we, AARON PALMER, of Brockport, in the county of Monroe and State of New York, and STEPHEN G. WILLIAMS, formerly of the same place, but now of Janesville, in the county of rock and State of Wisconsin, have invented certain new and useful Improvements in Harvesting-Machines; and we do hereby declare that the following is a full, clear, and exact description thereof, reference being had to the accompanying drawings, making a part of this specification, in which—

Figure 1 represents a view in perspective of a harvesting-machine to which our improvements are applied; and Fig. 2, a similar view of the driving-wheel and a portion of the arm or lever which carries the rake, showing more particularly the mechanism by which the latter is operated.

The object of the invention claimed under this patent is to discharge the grain from the platform on which it falls as it is cut by sweeping it automatically from said platform in curved lines, heads foremost, and delivering it upon the ground with the stalks crosswise to the direction of the swath, and out of the track of the horses when cutting the succeeding swath.

To this end our invention consists, first, of the combination, in a harvesting-machine, of the following members, viz: the cutting apparatus to sever the stalk of grain, a quadrant-shaped platform arranged behind the cutting apparatus to receive the stalks of grain as they fall after cutting, a sweep-rake, and mechanism to operate the rake in such manner that its teeth are caused to move in circular curves over the platform when they are acting on the grain.

The second part of the invention consists of the combination, in the harvesting-machine, of the following members, viz: a quadrant-shaped platform, a sweep-rake, mechanism which causes the said rake to move alternately in opposite directions or vibrate, an inclined guide-rail to raise the rake when it is moved forward, and a gate or switch to cause the rake to be acted upon by said rail.

The accompanying drawings represent a convenient arrangement of parts of a harvesting-machine for carrying out the object of our invention.

The frame is composed of three longitudinal beams, H I J, and two transverse beams, F G, the whole being securely fastened together at their points of intersection. The main or driving wheel A is placed between the outer longitudinal beam, I, and the central beam, H, and has its bearings in arched supports or brackets E rising from each of these beams.

Guard-fingers *t*, through which a sickle, M, vibrates, are secured upon the front edge of a platform, D, upon which the heads and upper portions of the stalks of grain fall as they are severed by the cutting apparatus, which may be constructed and operated in any suitable manner. The platform resembles in shape a quadrant or sector of a circle, (with the triangular point removed,) of which the arm or lever which carries the rake-head forms the radius, and the fulcrum-pin on which said lever vibrates the center, in order that the grain may be swept round in an arc of a circle and be discharged upon the ground behind the driving-wheel. A tongue for the team to draw by is secured rigidly to the frame in line with the central beam, H, and projects forward at a right angle, or thereabout, to the front edge of the frame.

A fence or guard, O, which may either be made straight or curved to correspond with the sweep of the inner end of the rake, arises from the inner edge of the platform, and prevents the grain from falling off or becoming entangled in the gearing. The front end of this guard may also be curved outward and secured to the tongue, and thus act as a guide to bring the grain in toward the cutting apparatus. A curved fence or guard, N, rises from the outer edge of the platform, with which it corresponds in curvature, and serves to prevent the grain from being deflected from its path or thrown from the platform by the centrifugal force generated by the circular movement of the rake.

The arm or lever B, which carries the rake, has lugs or projections *n b* secured upon the upper and lower sides of its inner end, on each of which lugs cogs or teeth are arranged so as to form a circular rack or cog-segment. These lugs embrace brackets or ears *e e*, projecting horizontally from the wheel-support E, and are held in place by a fulcrum-pin, S, which passes through both ears and lugs. This fulcrum-pin thus serves not only to hold the arm or lever B in a horizontal position without support at its outer end, but also forms the center of motion on which it moves freely over the platform. This arm or lever is operated by means of teeth or cogs secured upon the inner face of the driving-wheel in such manner as to form segments of pinions, as shown in Fig. 2. The teeth *q* of the segment which gears into the rack on the lower lug, *b*, of the arm or lever B are placed nearer to the axis of the driving-wheel than the teeth *p* of the segment which gears into the rack of the upper lug, *n*, of the lever. The teeth *q* of the inner segment project outwardly, while those *p* of the outer set project inwardly.

The rake-head C, into which the rake-teeth are inserted, is connected to the operating-lever B by hinge-joints that allow it the proper degree of vertical play. A guide-rod, *c*, projects from the outer end of the rake-head in the same axial plane for a purpose hereinafter explained. An inclined guide-rail, *d*, which slopes gradually from front to rear of the machine, is supported above the outer fence, N, with which it conforms in curvature, by means of brackets $d'$ $d^2$, curved outwardly to permit the end of the guide-rod *c* to travel beneath the guide-rail when running backward. A short section of the rear end of the rail *d* is hinged, so as to form a switch or gate, *f*, capable of moving vertically on its pivot, the rear end of which section rests upon the guard N. A guard-rail, *g*, having an upward inclination, surmounts the after end of the guard N. The outer or grain end of the machine is supported by a wheel, K, having its bearings in the outer longitudinal beam, J.

The operation of the machine is as follows: As the wheel to which the gearing is attached travels over the ground the machinery is set in motion and the cutters sever the standing grain, which falls upon the platform behind it with the heads of the stalks toward the rear of the machine. Suppose the rake to occupy the position shown in Fig. 1—that is, to be running forward. When in this position the teeth *q* are in gear with the rack *b*, and the rake-head C is held above the falling grain by the guide-rod *c* on its outer end sliding upon the inclined guide-rail *d*. The continued rotation of the driving-wheel causes the lever B (which always moves in the same horizontal plane) to push the rake before it until the guide-rod *c* has passed beyond the front end of the guide-rail *d*, when the rake drops suddenly upon the platform, its teeth striking into the butts of the fallen grain as it lies thereon. By this time the teeth *q* have escaped from the rack *b* and the forward movement of the rake ceases. The two sets of teeth *p* and *q* are arranged upon the face of the driving-wheel in such relation to each other that the moment the latter escape from the lower rack, *b*, of the lever B the former engage with the upper rack, *n*, and reverse the motion of the lever. The rake then travels backward, (describing an arc of a circle, of which the fulcrum-pin S forms the center and the operating-lever B the radius,) drawing the grain with it, and discharges it head foremost upon the ground behind the machine, with its stalks crosswise to the direction of the swath and sufficiently removed from the standing grain to be out of the path of the team during their succeeding tour around the field. As the rake approaches its extreme rearward point the guide-rod *c* lifts the switch *f* and passes beyond it, when the switch immediately resumes its former place. The guard-rod *g* on the rear of the guard N prevents the rake from going back so far as to drop off the end of the guard. The teeth *p* and *q* are so arranged upon the driving-wheel that when the backward movement of the rake has ceased, by reason of the teeth *p* escaping from the upper rack, *n*, the teeth *q* do not immediately engage with the lower rack, *b*, to start the rake forward, but the rake remains at rest while the driving-wheel makes about two-thirds of a revolution, by which means a sufficient pause is made to allow a quantity of grain sufficient to form a gavel to accumulate upon the platform. The rake then begins its forward movement, the guide-rod *c* now sliding on the inclined guide-rail and elevating the rake-head until it reaches the front edge of the platform, when the rake falls and the operations above described are repeated. By this description, then, it will be seen that the operation of the rake is such that it is moved to the front of the platform without interfering with the falling grain; then that its teeth are caused to sweep backward in circular curves over the platform, so as to remove the grain heads foremost therefrom, and to discharge it with the stalks crosswise to the direction of the swath, or the track pursued by the machine. The arrangement of the operating-lever B is such as to enable the gearing which moves it to be located at the stubble side of the platform and near one end of the cutting apparatus, where it is out of the way, securely protected from dirt, stalks, &c., and close to its prime mover, while the lever which carries the rake moves directly behind the cutting apparatus in the most favorable position for acting upon the grain as it falls upon the platform.

We have called the platform above described a "quadrant-shaped" platform because it is a convenient name to indicate its form, and not because it has the form of an exact quadrant of a circular disk, for it will be noticed that as the center of the fulcrum-pin on which the rake-lever moves is a little in the rear of the line of the cutting apparatus the front portion of the platform is straighter that the corresponding part of a geometrical quadrant, while the delivery side of the platform is not at a right angle with the front edge thereof at the cutting apparatus. The triangular point is also removed. The precise form of the platform is not important so long as the mode of operation is preserved, by which we mean so long as the platform is so shaped and arranged in the rear of the cutting apparatus that the grain received thereon can be removed from the cutting apparatus heads foremost and in a curve, and discharged therefrom crosswise to the direction of the swath and out of the way of the team or the machine when cutting the next swath. So, also, it is not necessary that the mechanism for operating the rake should be constructed as represented in the drawings in order to embody the first part of our invention, provided the rake be caused to operate in the same manner while its teeth are acting on the grain—that is to say, provided the rake-teeth are then caused to sweep over the platform in circular curves. Moreover, it is not necessary that the mechanism for operating the rake should be constructed as represented in the drawings in order to embody the second part of our invention, provided the rake be caused to move alternately backward and forward.

What we claim under this patent as our invention is—

1. The combination of the cutting apparatus of a harvesting-machine with a quadrant-shaped platform arranged in the rear thereof, and a sweep-rake operated by mechanism in such manner that its teeth are caused to sweep over the platform in curves when acting on the grain, these parts being and operating substantially as hereinbefore set forth.

2. The combination of a quadrant-shaped platform, a sweep-rake operated by mechanism which causes the rake to move in alternately opposite directions, an inclined rail to raise the rake, and a switch, these parts being and operating substantially as hereinbefore set forth.

In testimony whereof we have hereunto subscribed our names.

AARON PALMER.
STEPHEN G. WILLIAMS.

Witnesses as to Aaron Palmer:
GEO. H. ALLEN,
CHAS. W. PALMER.
Witnesses as to S. G. Williams:
I. B. DOE,
GEO. G. WILLIAMS.